United States Patent
Nahum et al.

(10) Patent No.: US 10,721,343 B2
(45) Date of Patent: *Jul. 21, 2020

(54) SPINNING ACCESSORY FOR A MOBILE ELECTRONIC DEVICE

(71) Applicant: POPSOCKETS LLC, Boulder, CO (US)

(72) Inventors: Altan Nahum, Boulder, CO (US); David B. Barnett, Boulder, CO (US); Tony L. Torrance, Boulder, CO (US)

(73) Assignee: POPSOCKETS LLC, Boulder, CO (US)

( * ) Notice: Subject to any disclaimer, the term of this patent is extended or adjusted under 35 U.S.C. 154(b) by 55 days.

This patent is subject to a terminal disclaimer.

(21) Appl. No.: 16/248,339

(22) Filed: Jan. 15, 2019

(65) Prior Publication Data
US 2019/0245960 A1    Aug. 8, 2019

Related U.S. Application Data

(63) Continuation-in-part of application No. PCT/US2018/025814, filed on Apr. 3, 2018, which is a continuation-in-part of application No. 15/729,260, filed on Oct. 10, 2017, now Pat. No. 10,389,860.

(60) Provisional application No. 62/614,916, filed on Jan. 8, 2018, provisional application No. 62/481,041, filed on Apr. 3, 2017.

(51) Int. Cl.
*H04M 1/04*    (2006.01)
*H04B 1/03*    (2006.01)
*A45F 5/00*    (2006.01)
*H04B 1/3888*  (2015.01)

(52) U.S. Cl.
CPC ............. *H04M 1/04* (2013.01); *A45F 5/00* (2013.01); *A45F 2200/0508* (2013.01); *A45F 2200/0516* (2013.01); *A45F 2200/0525* (2013.01); *H04B 1/3888* (2013.01)

(58) Field of Classification Search
CPC .......... H04B 1/03; H04M 1/04; H04M 1/185; H04M 1/0258; H04M 1/03
See application file for complete search history.

(56) References Cited

U.S. PATENT DOCUMENTS

| | | | |
|---|---|---|---|
| 4,328,942 A | 5/1982 | Birnbaum |
| 8,560,031 B2 | 10/2013 | Barnett et al. |
| 9,221,582 B2 | 12/2015 | Wheeler et al. |
| 9,787,348 B2 | 10/2017 | Srour |
| 9,804,636 B2 | 10/2017 | Barnett et al. |

(Continued)

FOREIGN PATENT DOCUMENTS

JP    H1155378 A    2/1999

OTHER PUBLICATIONS

Search Report and Written Opinion for PCT/US2018/025814, dated Jun. 15, 2018.

*Primary Examiner* — Andrew Wendell
(74) *Attorney, Agent, or Firm* — Irell & Manella, LLC

(57) ABSTRACT

A spinning accessory for use with a socket accessory attached to a mobile electronic device. The spinning accessory includes a bearing assembly sized to receive the socket accessory, and a gripping member carried by an inner surface of the bearing assembly. The bearing assembly facilitates rotation of a portion of the spinning accessory relative to the socket accessory. The gripping member is adapted to securely engage a portion of the socket accessory.

9 Claims, 8 Drawing Sheets

(56) References Cited

U.S. PATENT DOCUMENTS

| | | |
|---|---|---|
| 9,958,107 B1 | 5/2018 | Hobbs et al. |
| 9,991,581 B2 | 6/2018 | Taptic et al. |
| 10,019,034 B2 | 7/2018 | Barnett et al. |
| 2010/0155550 A1 | 6/2010 | Weiss-Vons |
| 2012/0329534 A1 | 12/2012 | Barnett et al. |
| 2013/0087517 A1 | 4/2013 | Zhong |
| 2016/0209733 A1 | 7/2016 | Akai et al. |
| 2017/0349116 A1 | 12/2017 | Liao |
| 2017/0359095 A1 | 12/2017 | Fleckenstein |
| 2018/0288204 A1* | 10/2018 | Nahum ............... H04M 1/04 |
| 2018/0332155 A1 | 11/2018 | Babbage, III et al. |

* cited by examiner

SPINNING ACCESSORY FOR A MOBILE ELECTRONIC DEVICE

RELATED APPLICATIONS

This application is a continuation of International Application No. PCT/US2018025814, entitled "Spinning Accessory for a Mobile Electronic Device" and filed Apr. 3, 2018, which claims priority to and the benefit of the filing dates of U.S. Provisional Application No. 62/614,916, entitled "Spinning Accessory for a Mobile Electronic Device" and filed Jan. 8, 2018, and U.S. Non-Provisional application Ser. No. 15/729,260, entitled "Spinning Accessory for a Mobile Electronic Device" and filed Oct. 10, 2017, which in turn claims priority to and the benefit of the filing date of U.S. Provisional Patent Application No. 62/481,041, entitled "Spinning Accessory for Mobile Electronic Device" and filed Apr. 3, 2017. The entire disclosure of each of these applications is hereby expressly incorporated by reference herein for all uses and purposes.

FIELD OF THE INVENTION

The present invention relates to accessories for mobile electronic devices, particularly accessories that, when attached to the mobile electronic device, allow the mobile electronic device to spin relative to the accessory (or some part of the accessory).

BACKGROUND

U.S. Pat. No. 8,560,031 discloses extendable socket accessories, formed of accordion-like socket structures and having buttons attached at their distal ends, for attaching to mobile electronic devices or cases for mobile electronic devices. When attached, the extendable socket accessories can be used to grip the mobile electronic device (and/or the case), as a stand for the mobile electronic device (and/or the case), and to manage cords associated with the electronic device.

BRIEF DESCRIPTIONS OF DRAWINGS

SUMMARY

Figure 1:
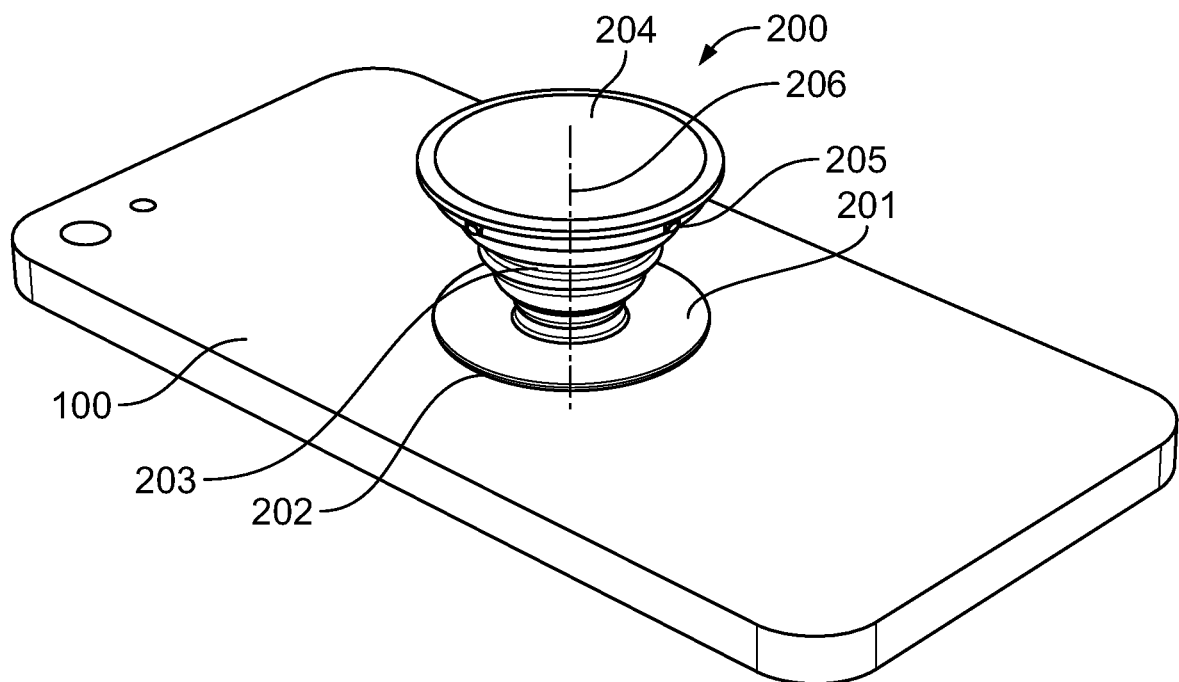
FIG. 1 is an isometric view of one example of an expanding socket accessory for a mobile electronic device, in the expanded position.

One aspect of the present disclosure provides a spinning accessory for use with a socket accessory attached to a mobile electronic device. The spinning accessory includes an inner ring defining a central opening sized to receive the socket accessory, an outer ring surrounding the inner ring, and one or more balls arranged between the inner ring and the outer ring. The one or more balls are configured to facilitate rotation between the inner ring and the outer ring such that the mobile electronic device is rotatable relative to a portion of the spinning accessory. The spinning accessory also includes a gripping member carried by an inner surface of the inner ring. The gripping member is adapted to securely engage a portion of the socket accessory.

Another aspect of the present disclosure provides a spinning accessory for use with a socket accessory attached to a mobile electronic device. The spinning accessory includes a bearing assembly sized to receive the socket accessory, a gripping member, and a gripping rim. The bearing assembly facilitates rotation of a portion of the spinning accessory relative to the socket accessory. The gripping member is carried by an inner surface of the bearing assembly and is adapted to securely engage a portion of the socket accessory. The gripping rim is carried by an outer surface of the bearing assembly.

DETAILED DESCRIPTION

The present disclosure relates to spinning accessories for mobile electronic devices (e.g., smartphones, tablet computers, electronic readers, digital media players, cameras, and other mobile electronic devices having a surface suitable for receiving a spinning accessory). The "spinning accessories" disclosed herein can be directly attached to a mobile electronic device or can be indirectly attached by attaching the accessory to a mobile electronic device case or other accessory that attaches to the mobile electronic device. When attached, the spinning accessories allow the mobile electronic device to spin relatively free of friction, relative to the spinning accessory or some part of the spinning accessory. The spinning accessory generally includes a bearing assembly (e.g., a ball bearing assembly) that facilitates a low-friction attachment point between a part of the accessory that is held stationary and the remaining part of the accessory, which spins relative to the stationary part when a rotational force is applied in the appropriate direction. Alternatively, the mobile electronic device and part of the spinning accessory can be held fixed while the remaining part spins when a rotational force is applied to it in the appropriate direction. In one embodiment, a method for fixing the position of part of the spinning accessory includes resting or mounting that part on a surface so that friction between it and the surface or a mounting device on the surface prevents it from rotating when a rotational force is applied to the mobile electronic device to which it is attached.

In one embodiment, the spinning accessory can be removable and repositionable on the mobile electronic device. In other embodiments, the spinning accessory can be permanently adhered or formed into the mobile electronic device or device case.

The spinning accessory can be of any appropriate size and shape suitable for spinning on a surface when attached to a mobile electronic device.

In certain instances, a software application of a mobile electronic device may provide feedback to a user while the mobile electronic device is spinning and the spinning accessory is attached to the mobile electronic device. The software application can provide feedback in the form of images, videos, or sounds that are causally correlated with the spinning of the mobile electronic device, sound variations that correspond to the spinning of the mobile electronic device, or other feedback corresponding to the spinning of a mobile electronic device.

In some instances, a method for spinning, viewing, and listening to a mobile electronic device is provided. The method for spinning the mobile electronic device includes attaching a spinning accessory to the back surface of the mobile electronic device, spinning the mobile electronic device relative to a stationary object (e.g., a portion of the spinning accessory), detecting the angular velocity of the spinning mobile electronic device with a gyrometer or other type of accelerometer carried by the accessory and in wireless communication (e.g., Bluetooth) with the electronic device or carried by the electronic device itself, detecting the magnetic orientation of the spinning mobile electronic device, and using the angular velocity and magnetic orientation to modify the visual display and/or sound output of the mobile electronic device. The method for spinning and viewing a mobile electronic device can include attaching a spinning accessory to the back surface of the mobile electronic device, spinning the mobile electronic device relative to a stationary object (e.g., a portion of the spinning accessory), displaying visual information on the screen of the mobile electronic device, and viewing the display of the mobile electronic device, the display of the mobile electronic perceived to be enlarged by the spinning motion of the mobile electronic device when the spinning accessory is attached to the mobile electronic device.

In some embodiments, displays, lights, and speakers and other transducers of the mobile electronic device, with the spinning accessory attached thereto, may act in cooperation with gyroscope, accelerometer, magnetometer, and other sensors of the mobile electronic device. In other embodiments, displays, lights, and speakers and transducers of the mobile electronic device, with the spinning accessory attached thereto, may act independent of the sensors of the mobile electronic device. In an embodiment, while the mobile electronic device is spinning, the spin rate and position of the mobile electronic device can be detected by sensors of the mobile electronic device and used to change outputs (e.g., audio and/or video outputs) of the mobile electronic device and the spinner accessory. In other embodiments, the spinning accessory can create a kinetic harvester, in which spinning of the mobile electronic device and the spinning accessory charges the mobile electronic device. The kinetic harvester can include enclosed LED lights, engaged when the spinning accessory is spinning or when the mobile electronic device is spinning. In further embodiments, the spinning accessory can include an electromechanical motor that acts to spin one bearing surface relative to the other.

It is to be understood that although particular embodiments are presented herein, such as a spinning accessory attached to a mobile electronic device, the accessories disclosed herein can be of any number of different shapes, sizes, and configurations without departing from the nature of the disclosure. The scope of the disclosure described herein with respect to the particular embodiments set forth in reference to the figures is not intended to be unduly limiting.

According to one aspect of the present disclosure, a spinning accessory for a mobile electronic device is provided. The mobile electronic device can be a smartphone, tablet computer, electronic reader, laptop, camera, music player, or the like. The mobile electronic device can have a front surface, a back surface, and side surfaces. The mobile electronic device can have a touchscreen or display and, in some instances, a keyboard or buttons. The mobile electronic device can have a camera on one or more surfaces and can have ports for interaction with power cords and headphones. The mobile electronic deviceis typically battery powered, but can in some instances be wirelessly powered.

The spinning accessories described herein may be used in connection with an expanding socket accessory for a mobile electronic device. Further description of such expanding socket accessories, which can be used, for example, as a docking accessory and for use as a grip and stand for a mobile electronic device, can be found in commonly owned U.S. Pat. No. 8,560,031, the entire disclosure of which is hereby incorporated by reference herein.

Figure 2:
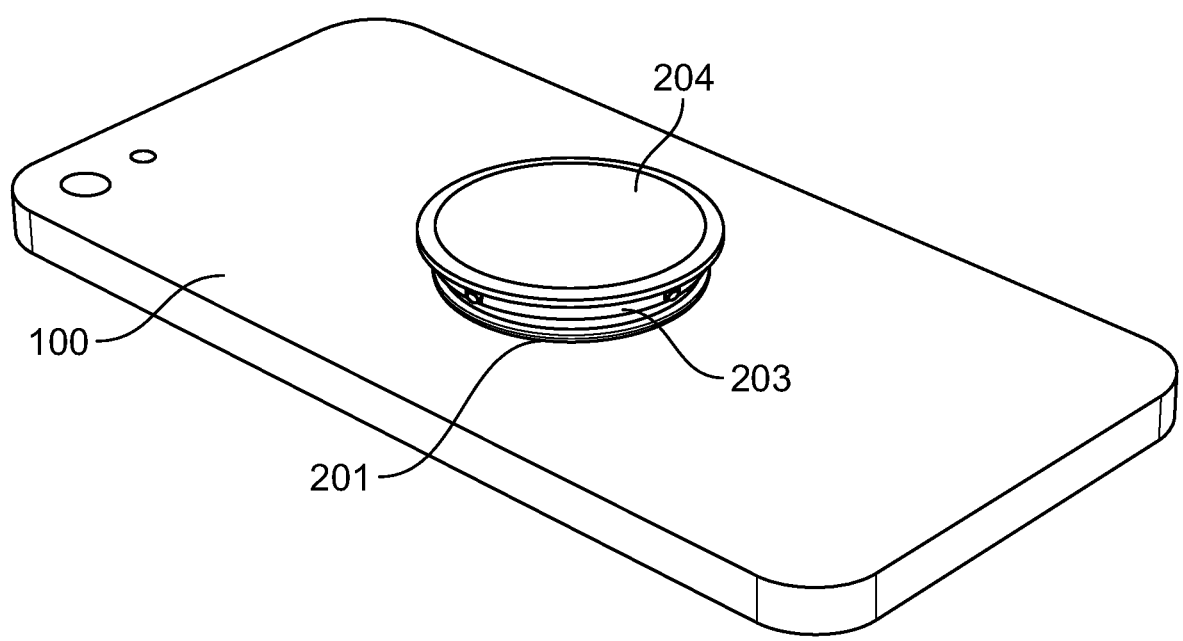
FIG. 2 is an isometric view of the expanding socket accessory of FIG. 1, but in the collapsed position.

FIGS. 1 and 2 show one example of an expanding socket accessory 200 removably coupled to a mobile electronic device 100, which in this example takes the form of a smartphone. In FIGS. 1 and 2, the mobile electronic device 100 has a rear surface that is flat, but this rear surface can instead be curved. The expanding socket accessory 200 is attached to the rear surface of the mobile electronic device 100.

As shown in FIGS. 1 and 2, the socket accessory 200 has a platform 201, an accordion 203, and a button 204 (which may also be referred to herein as a foot). The platform 201 can also be referred to as a securing element or a socket board and is generally configured to attach the socket accessory 200 to the mobile electronic device 100 (but can, in other instances, attach the socket accessory 200 to a case for the mobile electronic device 100). The platform 201 can, for example, include an adhesive material 202, for removably attaching socket accessory 200 to the mobile electronic device 100. In other examples, the platform 201 can include a suction cup, a specific type of adhesive material (e.g., glue, tape), or other means including mechanical locking means such as threads, hook and look fastening means, snap fit, etc., for attaching the socket accessory 200 to the mobile electronic device 100. The platform 201 can be made from any suitable material such as a thermoplastic polymer, polycarbonate, or the like. Alternatively, any other material, or combination of materials, that provide rigidity to platform 201, can be used.

The accordion 203 is attached to platform 201. The accordion 203 is movable relative to the platform 201 along a central axis 206 of the accessory 200. More specifically, the accordion 203 can expand as shown in FIG. 1 and collapse as shown in FIG. 2. The material used to create and form accordion 203 can be any suitable material such as a flexible thermoplastic elastomer, rubber, or other flexible or semi-rigid material. Accordion 203 can have portions of its walls having different thicknesses, to provide rigidity when expanded, as shown in FIG. 1, and provide flexibility to collapse onto itself, as shown in FIG. 2. In the depicted embodiment, the accordion 203 includes a plurality of folds and has tapered profile converging from a maximum diameter adjacent to the button 204 to a minimum diameter adjacent to the platform 201. The folds can assist with collapsing and expanding the accordion 203 and providing structural integrity when residing in the collapsed state (FIG. 2) and/or expanded state (FIG. 1). The tapered configuration can assist with providing a comfortable ergonomic gripping feature for users. In the disclosed embodiment, the accordion 203 is self-supporting such that no additional structure is required to support the accordion 203 in the expanded position shown in FIG. 1. In other embodiments, however, other structures can be used. In fact, in one embodiment, the socket accessory 200 can further include a biasing member disposed inside of the accordion 203 to bias the accessory 200 into the expanded state depicted in FIG. 1. It should also be appreciated that in embodiments where the accordion 203 includes a biasing mechanism, it may also be beneficial to include a locking feature to retain the accessory 200 in the collapsed configuration against the urging of the biasing device. Such a locking feature may take the form of a snap fit connection between the button 204 of the accessory 200 and the platform 201. It should also be appreciated that in embodiments with biasing devices, the accordion 203 may not necessarily require any folds so that the accordion 203 in fact does not resemble an accordion, but rather, a simple skirt or skin. One example of such a biased accessory is described in U.S. Provisional Patent Application Ser. No. 62/376,237, filed Aug. 17, 2016, the entire contents of which are hereby incorporated herein by reference.

Still referring to FIGS. 1 and 2, the button 204 is attached to the accordion 203 such that the button 204 is also movable relative to the platform 201 along the axis 206. The button 204 can be co-molded, adhered to, or integrally molded to the accordion 203 such that the button 204 is permanently attached to accordion 203. Alternatively, the button 204 can be removably attached to the accordion 203. For example, the button 204 can be attached to the accordion 203 with tabs 205 extending from button 204 that engage with openings in the accordion 203. The material used to create button 204 can be any suitable material such as polycarbonate. Alternatively, any other material, or combination of materials, can be used to form button 204, such as wood, metal, glass, or the like. Button 204 can also be formed of a rigid material and can have a cavity to hold a different material, such as leather, fabric, gel, or the like. Button 204 can include graphics, printed or molded images, or textures, or combinations thereof, on its surface.

Figure 3:
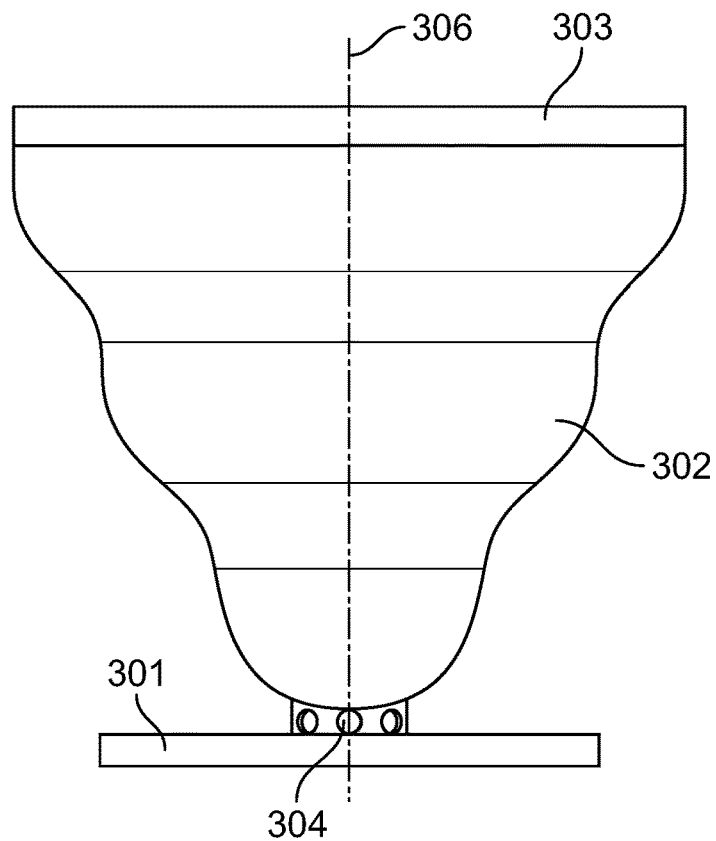
FIG. 3 is a side view of one example of a spinning expanding socket accessory.

FIG. 3 shows one example of a spinning expanding socket accessory 300. Spinning expanding socket accessory 300 can also be referred to as a spinning accessory, a spinner, a spinning system, a spinning socket accessory, or a spinning socket. The spinning accessory 300 includes a platform 301, an accordion 302, and a button 303. Platform 301 is similar to and can include all the same aspects as platform 201. Accordion 302 is similar to and can include all of the same aspects as accordion 203. Button 303 is similar to and can include all of the same aspects as button 204. Thus, further details regarding the platform 301, the accordion 302, and the button 303 are omitted in the interest of brevity.

Attached to the platform 301 and the accordion 302 of the spinning accessory 300 is a bearing assembly in the form of a ball bearing assembly 304. The ball bearing assembly 304 includes two rings that contain races to hold a plurality of balls, such that motion and potential loads are transmitted through the balls and between the two rings. The ball bearing assembly 304 thus reduces rotational friction, allowing for less friction between two components when rotating.

Figure 9:
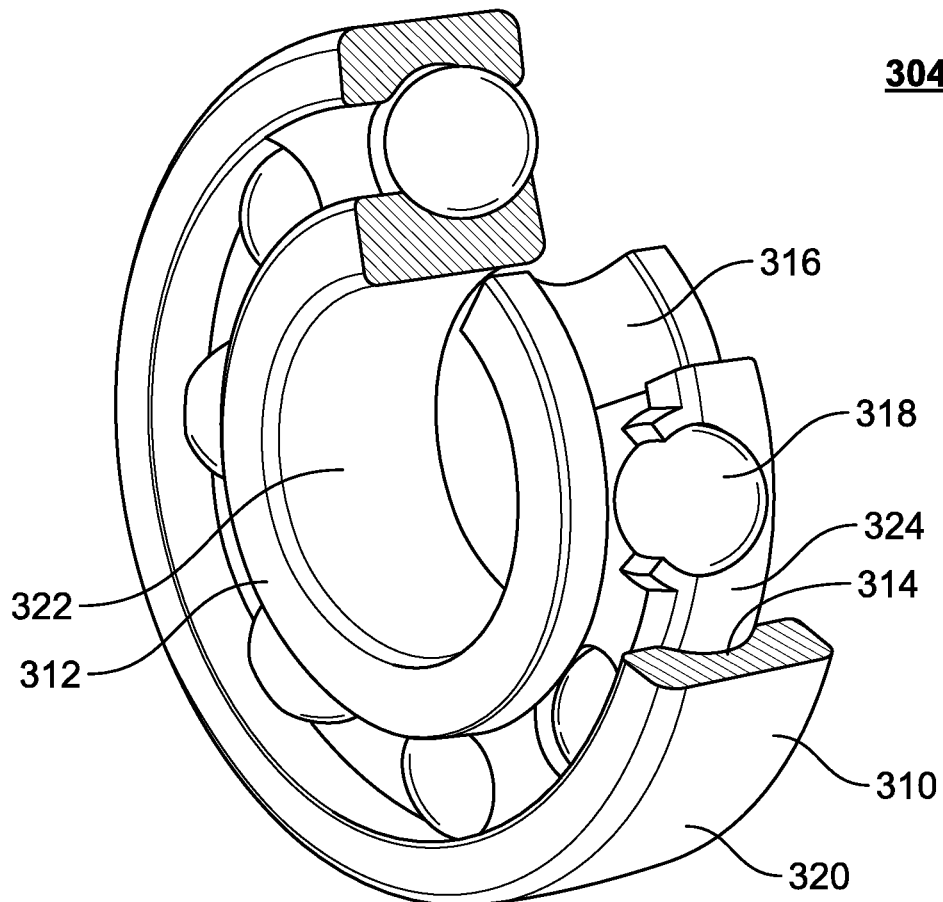
FIG. 9 is an isometric view of a cutaway of one example of a bearing assembly that can be incorporated into a spinning accessory.

FIG. 9 shows the ball bearing assembly 304 in greater detail. As shown, the ball bearing assembly 304 includes an outer ring 310, an inner ring 312, and a plurality of balls 318 arranged between the outer ring 310 and the inner ring 312. The outer ring 310 defines an outer race 314 and includes an outer surface 320. The inner ring 312 defines an inner race 316 and includes an inner surface 322. The plurality of balls 318 reside between the outer race 314 of the outer ring 310 and the inner race 316 of the inner ring 312. In some instances, balls 318 can be housed in cage 324, as shown in FIG. 9. The ball bearing assembly 304 can be made of any suitable material for standard ball bearings, including stainless steel, chrome steel, and, in some instances, ceramic. In other instances, ball bearing 304 can be a hybrid of materials: for example, the balls 318 can be ceramic balls and the races 314, 316 made of metal.

As generally discussed above, one portion of the spinning accessory 300 is held stationary, or fixed, such that the mobile electronic device 100 is rotatable relative to at least the fixed portion of the spinning accessory 300. In some instances, the outer ring 310 of the ball bearing 304 assembly is held stationary while the inner ring 312 rotates relative to the outer ring 310. In other instances, the inner ring 312 is held stationary while the outer ring 312 rotates relative to the inner ring 312. In yet other instances, portions of the spinning accessory 300 besides or in addition to the rings 310, 312 can be fixed or rotatable to facilitate the desired motion.

It will be appreciated that the inner ring 312 and the outer ring 310 of the ball bearing assembly 304 can have varying thicknesses and varying heights. In some instances, the outer ring 310 and the inner ring 312 have the same height, as shown in FIG. 9. In other instances, however, the outer ring 310 and the inner ring 312 can have different heights. It will also be appreciated that the balls 318 can be of varying size so as to accommodate varying sized inner and outer races 316, 314.

With reference back to FIG. 3, the ball bearing assembly 304 extends outward from the platform 301 and is connected to the accordion 302. The ball bearing assembly 304 can be attached in any number of ways to the platform 301. In some instances, the ball bearing assembly 304 is adhered to the platform 301 using an adhesive. In other instances, the ball bearing assembly 304 is press-fit into an opening in the platform 301. In yet other instances, the ball bearing assembly 304 can be attached using glue, a snap-fit assembly, or sonic or vibrational welding. In further instances, the ball bearing assembly 304 (or portions thereof) can be integrated into the platform 301 or other components of spinning accessory or expanding socket assembly 200.

The outer surface 320 of the outer ring 310 can be adhered to or press-fit into an opening in the platform 301. Once the platform 301 with the ball bearing assembly 304 are attached to a surface of a mobile electronic device (not shown) or a case for the mobile electronic device (also not shown), the outer ring 310 of ball bearing 304 is stationary (i.e., does not move), leaving the inner ring 312 to rotate relative to the outer ring 310 about axis 306 of the spinning accessory 300 (and, more particularly, the ball bearing assembly 304). In other embodiments, the inner ring 312 of ball bearing 304 can be adhered to the platform 301, such that the inner ring 312 is stationary, leaving the outer ring 310 of the ball bearing assembly 304 free to spin relative to the inner ring 312 about the axis 306. In yet other embodiments, the outer ring 310 or the inner ring 312 is rotatable about an axis different than the axis 306

While somewhat difficult to see in FIG. 3, the inner ring 312 of the ball bearing assembly 304 can be attached to the accordion 302. The accordion 302 can have a portion that is press-fit or extends into the inner ring 312 or is otherwise attached to the inner ring 312 of ball bearing 304. The ball bearing assembly 304 allows the accordion 304 and the attached button 303 to spin about the axis 306. When the spinning accessory 300 is attached to a rear surface of mobile electronic device 100 (shown in FIGS. 1 and 2), the mobile electronic device 100 can be positioned to rest on the button, with button 303 resting on an external surface, such as a table or other hard surface. With the button 303 resting on the external surface, the mobile electronic device 100 can be rotated or spun to initiate a spin of the mobile electronic device 100 that is prolonged due to the reduced frictional rotation of the ball bearing assembly 304 interacting between the platform 301 and the accordion 302.

The spinning accessory 300 can spin about the axis 306 and with the accordion 302 extended or collapsed. Thus, when the platform 301 is attached to a surface of mobile electronic device, the spinning accessory 300 can spin while the accordion 302 is extended or collapsed. When the spinning accessory 300 is attached to the mobile electronic device and placed on an external surface, the mobile electronic device can spin relative to the spinning accessory 300. The spinning accessory 300 can also spin while the mobile electronic device is resting on the external surface and spinning accessory 300 is extending away from the external surface. Additionally, the spinning accessory 300 can spin when the mobile electronic device is held in a user's hand or the mobile electronic device can spin while spinning accessory 300 is held in the user's hand. Likewise, when the spinning accessory 300 is attached to a case for a mobile electronic device, the case (and thus the device) can spin when the spinning accessory 300 is placed on an external surface, when the case is placed on an external surface, and when the case or the spinning accessory 300 is held in a user's hand.

While the bearing assembly 304 of FIG. 3 is a ball bearing assembly, the bearing assembly can instead take the form of a different bearing assembly, e.g., one that uses needle bearings or magnetic bearings instead of ball bearings. Alternatively, bushings and washers can be used in place of a ball bearing assembly to create the desired rotating/spinning effect for the spinning accessory 300.

Optionally, lights on the mobile electronic device 100 can operate in concert with the spinning action of the spinning accessory to create light-based visualizations, controlled by angular velocity of the spin and direction of the mobile electronic device. These visualizations can be displayed on the mobile electronic device and can be synced with music, the visualizations can be synced to the angular velocity, or, in some cases, the visualizations may appear stationary even though the display and mobile electronic device are spinning. In other embodiments, sound output of the mobile electronic device can be controlled by the angular velocity of the spin and the direction of the mobile electronic device. In even other embodiments, the mobile electronic device can display images or a series of images (e.g., video) in cooperation with the spinning action of mobile electronic device when the spinning accessory is attached to the mobile electronic device.

In certain embodiments, packaging can be included with the spinning accessory 300 that assists a user with ideal placement of spinning accessory onto their mobile electronic device. Packaging can include a visual indicator that is the same size as the surface of mobile electronic device, such as a template of the mobile electronic device surface, such that a user can properly align the spinning accessory 300 with a surface of mobile electronic device to ensure smooth spinning. The spinning axis can be orthogonal to the primary surface plane of mobile electronic device, spin amount can equal yaw. Angular velocity can be around a z-axis, with respect to surfaces of mobile electronic device having x-axis and y-axis directions. Spin axis may alternatively be placed to spin in pitch or roll, around the x-axis or y-axis, using a mounting system. This could enable the mobile electronic device to spin and appear as frames to an observer. The frame rate is roughly equivalent to the spin rate for a single display spinning. In some embodiments, the spinning system can increase the perceived visual size of the display of mobile electronic device through fast rotations of the mobile electronic device. The spinning system can change the perceived size from standard rectangular aspect ratio of the mobile electronic device to that of a circular display. Perceived circular display diameter can be equivalent to the diagonal screen size of the actual display.

Figure 4:
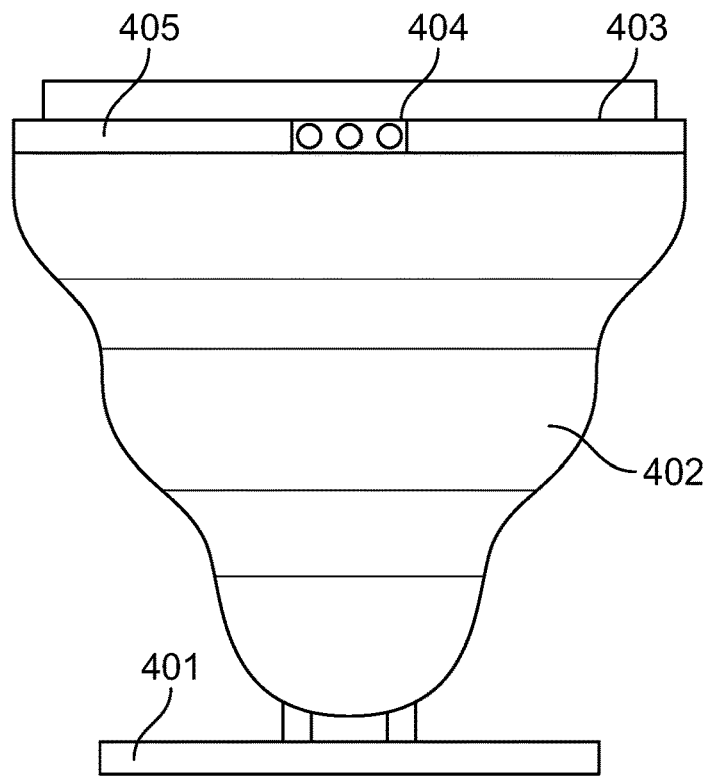
FIG. 4 is a side view of another example of a spinning expanding socket accessory.
Figure 5:
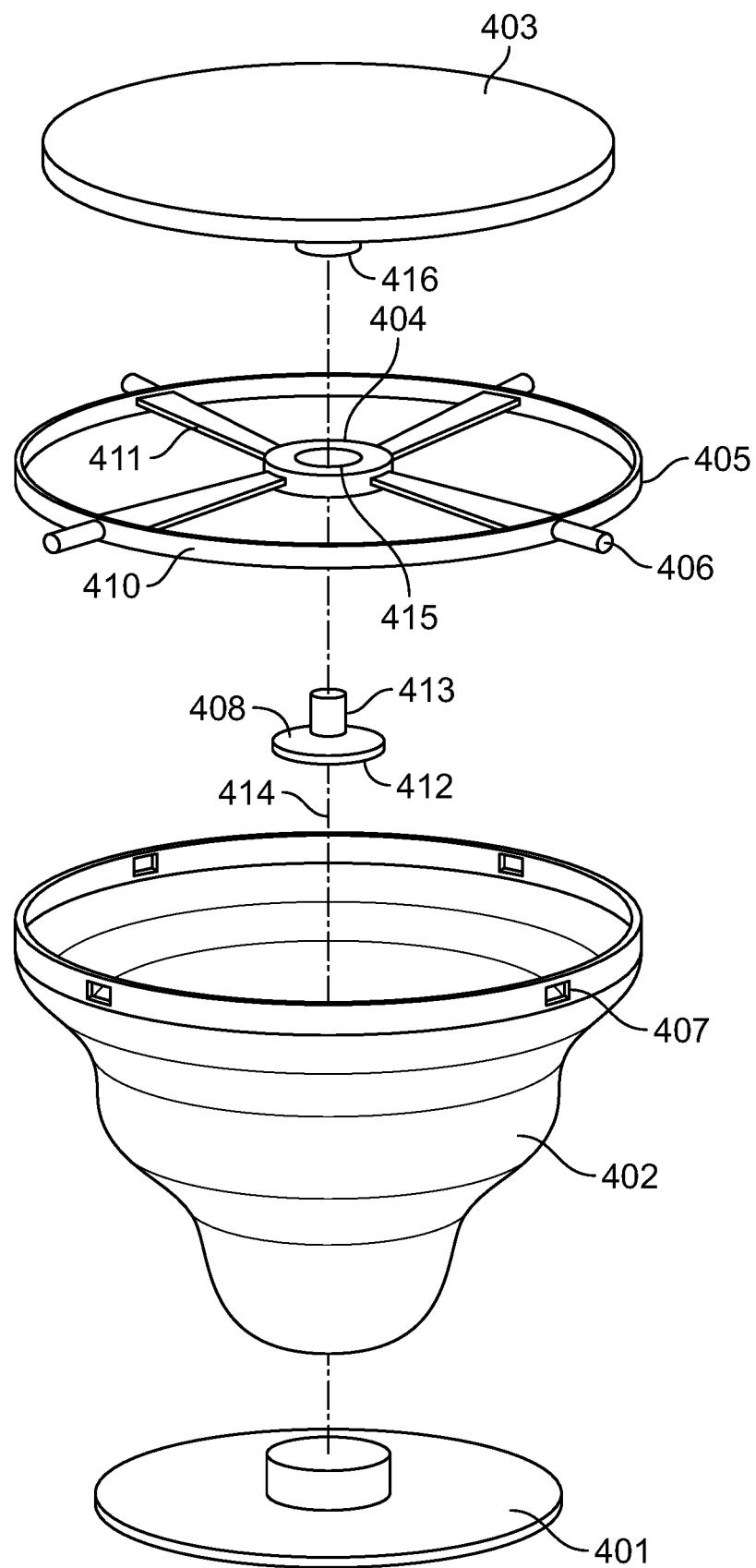
FIG. 5 is an exploded, side view of the spinning expanding socket accessory of FIG. 4.

FIGS. 4 and 5 illustrate another example of a spinning accessory 400. The spinning accessory 400 includes a platform 401, which is similar to the platform 201, an accordion 402, which is similar to the accordion 203, a button 403, which is similar to the button 204, and a ball bearing assembly 404, which is similar to the ball bearing assembly 304. However, unlike the spinning accessory 300, the spinning accessory 400 includes a frame 405 coupled to the accordion 402, the button 403, and the ball bearing assembly 404.

As best shown in FIG. 5, the frame 405 has a perimeter rim 410 and a plurality of ribs 411 that connect the perimeter rim 410 with the ball bearing assembly 404. The ribs 411 thus extend radially inward from the perimeter rim 410 toward the ball bearing assembly 404. The perimeter rim 410 has a circular shape that is sized to substantially match the diameters of the accordion 402 and the button 403 (which are substantially equal to one another). Frame 405 can be made of any suitable material such as polycarbonate or other rigid material.

In this example, the frame 405 can include tabs 406 that extend outward from the perimeter rim 410 and into slots 407 formed in and around the perimeter of the accordion 402, thereby coupling the frame 405 to the accordion 402. In other examples, the frame 405 can be coupled to the accordion 402 in a different manner (e.g., via adhesive, a magnetic connection, a frictional fit, or any other suitable means). In this example, the frame 405 is coupled to the button 403 by way of a securing element 408. The securing element 408 has a base 412 and a projection 413 that extends outward from the base 412. The projection 413 can be inserted into an opening 415 of the frame 405 that is centered about axis 414 and arranged radially inwardly of the ball bearing assembly 404, and then snapped into a downwardly extending protrusion 416 of the button 403 thru ball bearing 404. In other examples, the frame 405 can be coupled to the button 403 in a different manner (e.g., via adhesive, a magnetic connection, a frictional fit, or any other suitable means). Further, in this example, the ball bearing assembly 404 can be attached to the frame 405 by adhering the assembly 404 to the frame 405 or by press-fitting the assembly 404 into an opening in frame 405. In any event, when the assembly 404 is attached to the frame 405 and the frame 405 is coupled to the accordion 402, the outer ring of ball bearing assembly 404 remains stationary (i.e., does not rotate), as does the frame 405. The spinning accessory 400 can function while accordion 402 is extended or collapsed.

When the frame 405 is coupled to the button 403, the button 403 is connected with ball bearing assembly 404. More specifically, the projection 416 of the button 403 is removably disposed in the inner ring of the ball bearing assembly 404 or, alternatively, the projection 416 can be adhered to the inner ring of the ball bearing assembly 404. When the button 403 is coupled to the inner ring of the ball bearing assembly 404, the button 403 can freely spin relative to the remainder of spinning accessory 400 (e.g., the outer ring). Thus, when the spinning accessory 400 is attached to a surface of mobile electronic device 100 (or a case for the device 100), and mobile electronic device 100 (or the case) is positioned such that button 403 is resting on a stationary external surface, the button 403 can remain stationary due to friction of resting on the external surface while the remaining components of spinning accessory 400 spin easily (or relatively friction free) due to the rotation of the ball bearing assembly 404. In some instances, button 403 can be made of or include a material with a higher frictional make-up, so as to keep the button 403 stationary on the external surface while the remaining components of spinning accessory 400 spin around the axis 414.

It will be appreciated that the frame 405 can have various shapes and/or sizes, including the ability to house a larger diameter ball bearing assembly 404 such that the ball bearing assembly 404 extends closer along the larger diameter of accordion 402. In some instances, the ball bearing assembly 404 can have the same, or close to the same, diameter as the top portion of the accordion 402 or the outer diameter of the button 403. The diameter of the projection 416 of the can also be increased to accommodate larger diameter inner and outer rings of the ball bearing assembly 404. Depending on how large the diameter of ball bearing assembly 404 is, the frame 405 can have the ribs 411 as shown in FIG. 5, or can be a solid piece with an opening sized to accommodate the ball bearing assembly 404. The arrangement of FIG. 5 can provide a lighter weight and thinner component of the spinning accessory 400 and may be easier to manufacture, whereas a solid frame 405 can enhance the stability of the spinning accessory 400 when spinning.

Further, while the frame 405 is described as being part of the spinning accessory 400 (along with the platform 401, the accordion 402, the button 403, and the ball bearing assembly 404), it will nonetheless be appreciated that the frame 405 can itself be the spinning accessory 400. In other words, a socket accessory such as the socket accessory 200 can be retrofit with the frame 405 to convert the socket accessory 200 into a spinning socket accessory. This may be accomplished by, for example, removing the button 204 from the accordion 203, attaching (e.g., snapping) the frame 405 to the accordion 203, and then attaching the button 204 to the accordion 203 and the frame 405. The frame 405 can be attached to the accordion 203 as described above or in a different manner. Likewise, the button 204 can be attached to the accordion 203 and the frame 405 as described above or in a different manner.

Figure 6:
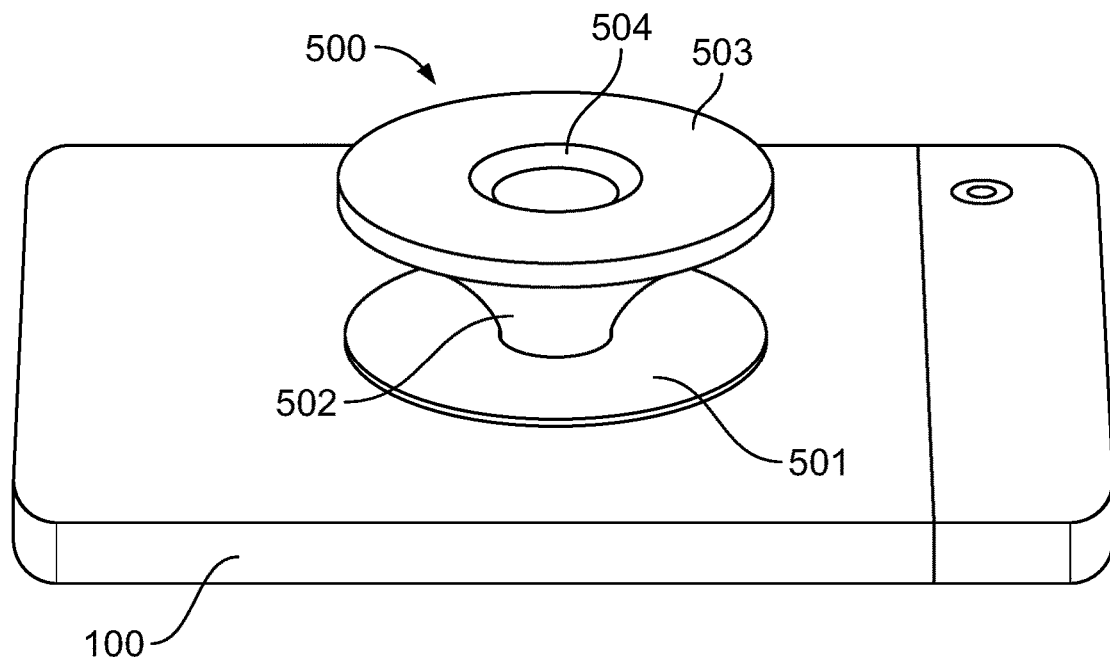
FIG. 6 is an isometric view of another example of a spinning expanding accessory for a mobile electronic device.

FIG. 6 illustrates another example of a spinning accessory 500 attached to a surface of the mobile electronic device 100. The spinning accessory 500 includes a platform 501 similar to the platform 201, a button 503 similar to the button 203, and a ball bearing assembly 504 that is similar to the ball bearing assembly 204 and attached to the platform 501 and the button 503. Consistent with the discussion above, the button 503 can be made of any suitable material, such as polycarbonate or other hard material, semi-hard material, or elastomer, and can include graphics, images, or molded or attached textures on its face. Unlike the spinning accessory 200, which includes the accordion 203, the spinning accessory 500 includes an extension 502 instead of the accordion 203.

The extension 502 can be integrally formed with the platform 501 or connected to platform 501 by way of snap-fit, press fit, elastomeric compression, magnetic attachment, mechanical means, or other suitable means. Extension 502 can vary in height and shape. In some embodiments, the inner ring of the ball bearing assembly 504 is attached or connected with the extension 502 and outer ring of the ball bearing assembly 504 is attached or connected to the button 503. Thus, when the button 503 is resting on a surface, the button 503 remains stationary while the extension 502 and platform 501, along with the removably attached mobile electronic device 100, can freely spin and continue to spin relative to the button 503 due to the ball bearing assembly 504. In other embodiments, the inner and outer rings of the ball bearing assembly 504 can be integrated with the platform 501 and the button 503. In some embodiments, the outer ring of the ball bearing assembly 504 can be integrated with the platform 501 and the inner ring of the ball bearing assembly 504 can be integrated with the button 503. In other embodiments, however, the outer ring of the ball bearing assembly 504 is integrated with the button 503 and the inner ring of the ball bearing assembly 504 is integrated with platform 501.

Figure 7:
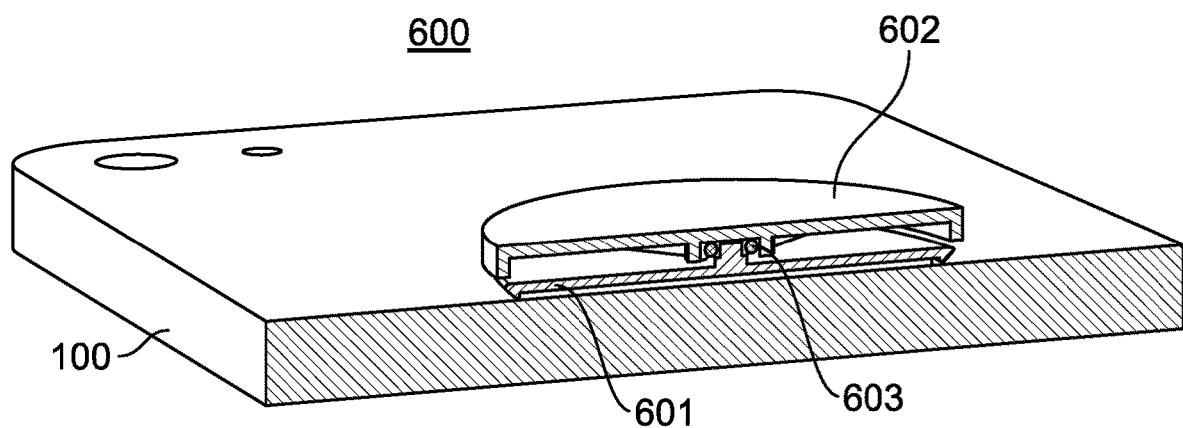
FIG. 7 is an isometric, section view of another example of a spinning expanding accessory for a mobile electronic device.

The spinning accessory 500 operates in a similar manner as the spinning accessory 400, but without an accordion component that extends and collapses the spinning accessory. FIG. 7 illustrates another example of a spinning accessory 600. The spinning accessory 600 is similar to spinning accessory 500. Thus, the spinning accessory 600 includes a platform 601, a button 602, and a ball bearing assembly 603. The platform 601 is similar to the platform 201, and the button 602 is similar to the button 204 and the button 503.

Figure 8:
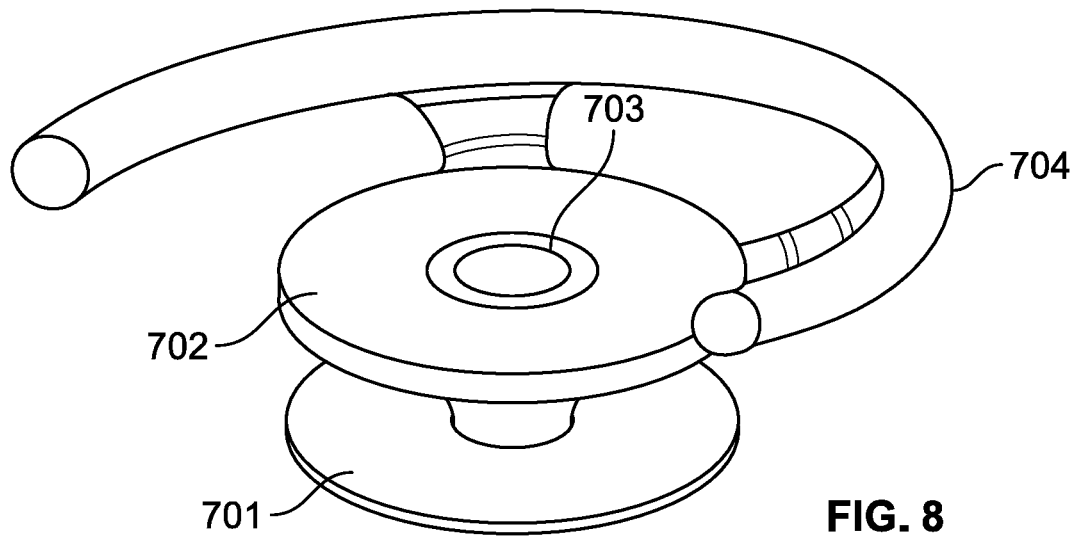
FIG. 8 is an isometric view of another example of a spinning accessory for a mobile electronic device.

FIG. 8 illustrates an example of a spinning clip 700. The spinning clip 700 includes a platform 701 that is similar to the platform 201, a raised plate 702, a ball bearing assembly 703 that is similar to the ball bearing assembly 304, and a clip rim 704.

Figure 10:
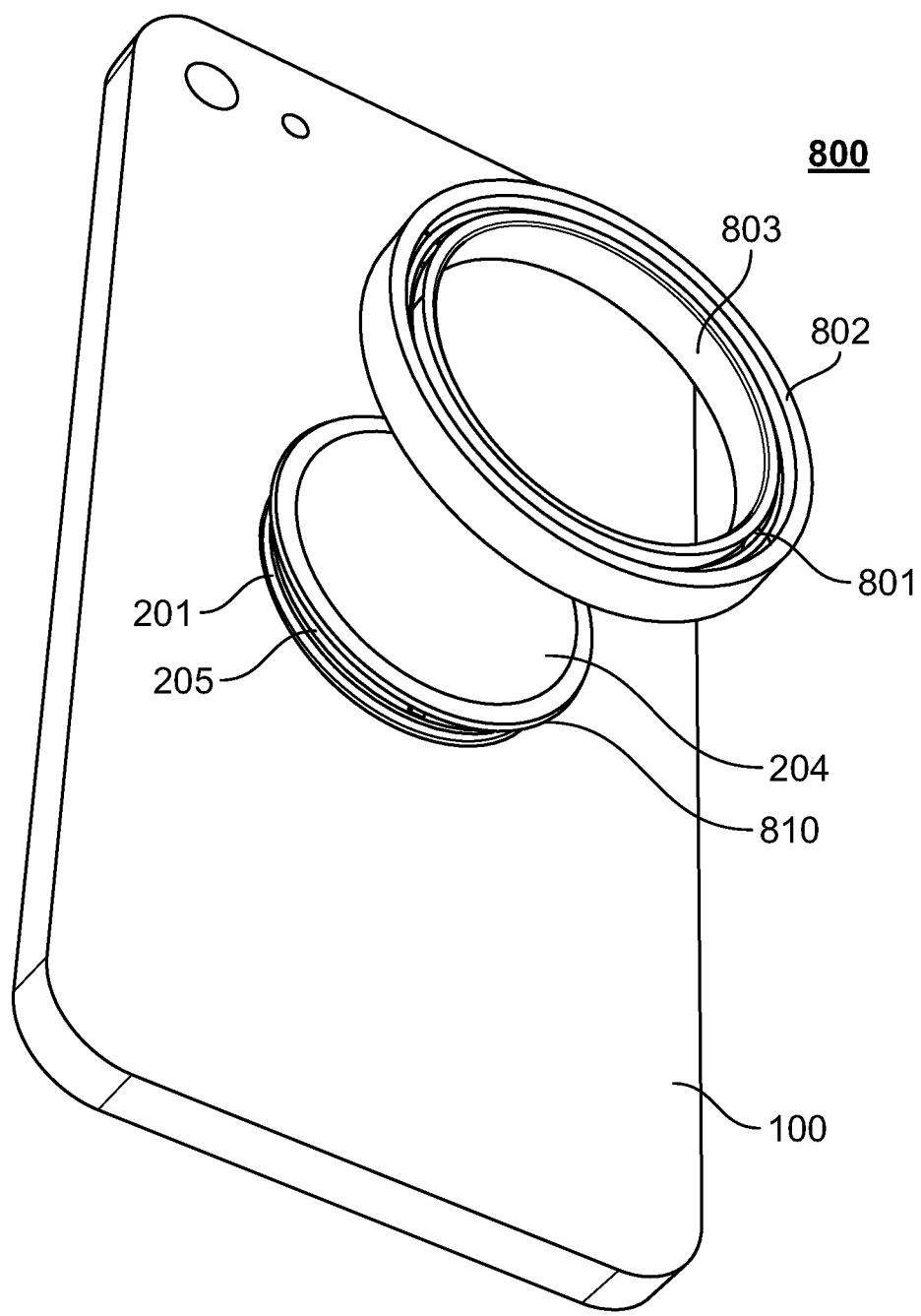
FIG. 10 is an isometric view of another example of a spinning expanding accessory for a mobile electronic device.

FIG. 10 illustrates yet another example of a spinning accessory 800. The spinning accessory 800 includes a bearing assembly in the form of ball bearing assembly 801. The ball bearing assembly 801 is similar to ball bearing 304, in that it includes an inner ring and an outer ring. The spinning accessory 800 also includes an extended surface 802 carried by (e.g., attached to) the outer ring. As an example, the extended surface 802 may extend axially outward from the outer ring. The extended surface 802, which can also be referred to as gripping band, gripping rim, or extended rim, can be made of any high-friction or gripping material, including rubber, thermoplastic, or a range of polymers. The spinning accessory 800 also includes a gripping member 803 carried by an inner surface of the inner ring for securely engaging a portion of an extending socket accessory. In the illustrated example, the gripping member 803 takes the form of an inner connection surface 803 carried by (e.g., attached to) an inner surface of the inner ring. The Inner connection surface 803, which can also be referred to as inner lining, connection band, or attachment band, can be made of any high-friction or gripping material, including rubber or gel. However, in other examples, the gripping member 803 can additionally or alternatively include one or more projections (e.g., tabs, threads, flanges), one or more recesses, one or more magnets, etc. As an example, the gripping member 803 can additionally or alternatively include one or more spring-biased tabs that selectively engage one or more recesses in the extending socket accessory.

As illustrated in FIG. 10, the spinning accessory 800 can be temporarily or permanently installed or placed around an extending socket accessory, such as the socket accessory 200 described above, that is attached to a mobile electronic device (e.g., the mobile electronic device 100). The spinning accessory 800 may, in some cases, have one or more colors and/or textures that match the color(s) and/or texture(s) of the socket accessory or the mobile electronic device to which it is attached. In any case, when the spinning accessory 800 is, for example, installed on the extending socket accessory 200, the inner connection surface 803 is placed around an outer diameter surface 810 of the button 204 of the socket accessory 200 and securely engages the outer diameter surface 810 due to the material characteristics of the inner connection surface 803 and due to a tight-fit tolerance between the outer diameter of the button 204 and the diameter of the inner connection surface 803. Alternatively, the inner connection surface 803 can attach to the outer diameter surface 810 (or other surfaces of the button 204) by way of snap fit, elastomeric compression, magnetic connection, or other means. In some embodiments, the connection may be achieved with a gripping member (e.g., a gripping surface) that comprises some combination of the foregoing means, and/or may include a mechanical connection means such as a threaded connection, or a connection where the outer diameter surface 810 of the button 204 snaps into an annular recess formed in the inner connection surface 803 of the accessory 800. In some embodiments, the gripping member can include the inner connection surface 803 also or alternatively having an annular flange or plurality of annular flanges that abut a top surface of the button 204 when assembled such that the button 204 does not pass through the spinning accessory 800. When the spinning accessory 800 is placed around the button 204 of socket accessory 200, the spinning accessory 800 can remain attached to the socket accessory 200 even when socket accessory 200 is extended or collapsed in its various configurations.

It will be appreciated that when the spinning accessory 800 is attached to the socket accessory 200, at least the extended surface 802 extends axially beyond the outer diameter surface 810 of button 204. In other words, the extended surface 802 has a height that is greater than a height of the outer diameter surface 810. As a result, the extended surface 802 can rest on an external surface such as a desk top or table top. Consistent with the foregoing, this allows the socket accessory 200 attached to the mobile electronic device 100 to be spun, relative to the extended surface 802, in a friction-free environment (due to the ball bearing assembly 801 of the spinning accessory 800).

Figure 11:
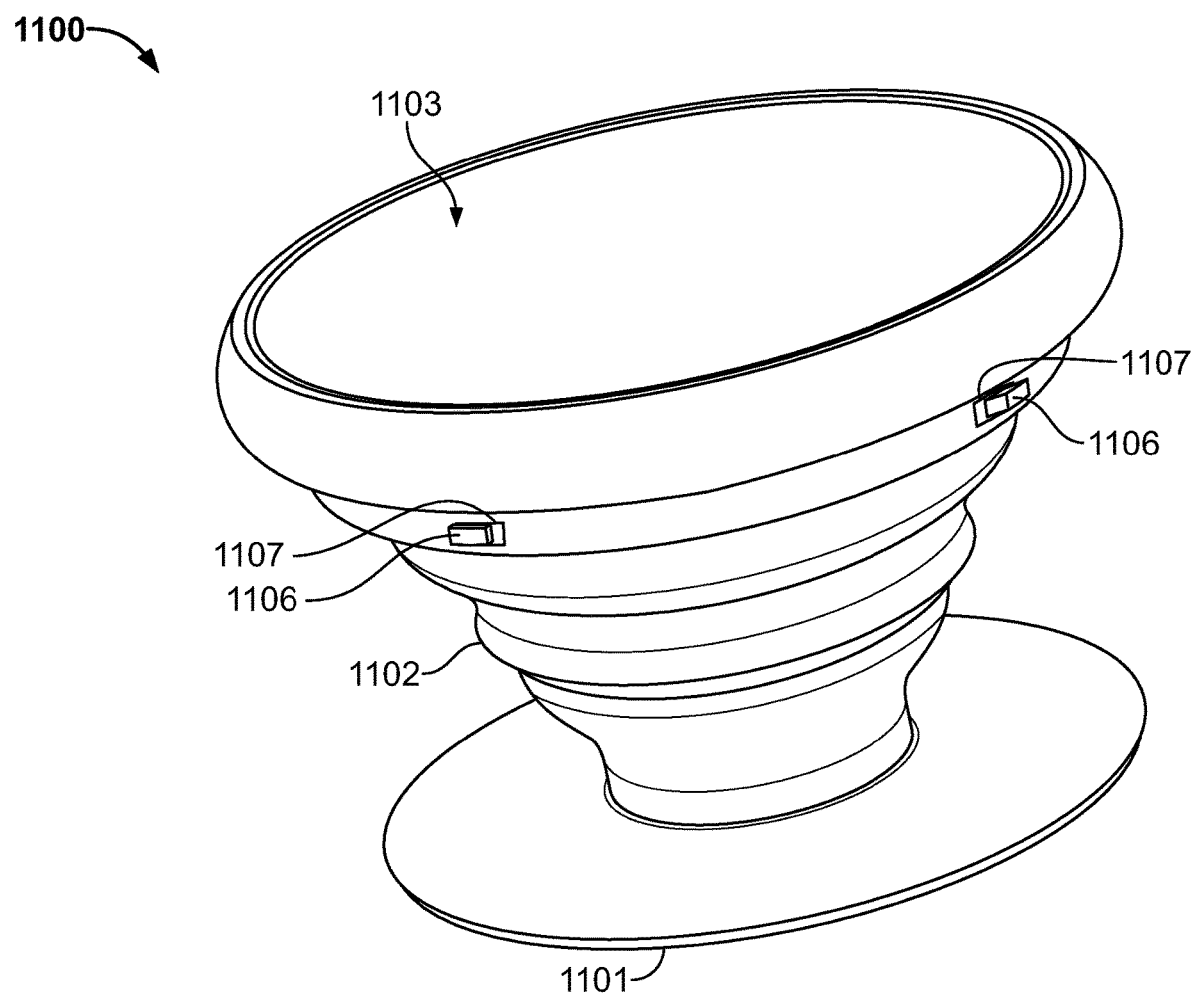
FIG. 11 is a perspective view of another example of a spinning expanding accessory for a mobile electronic device, in the expanded position.
Figure 12:
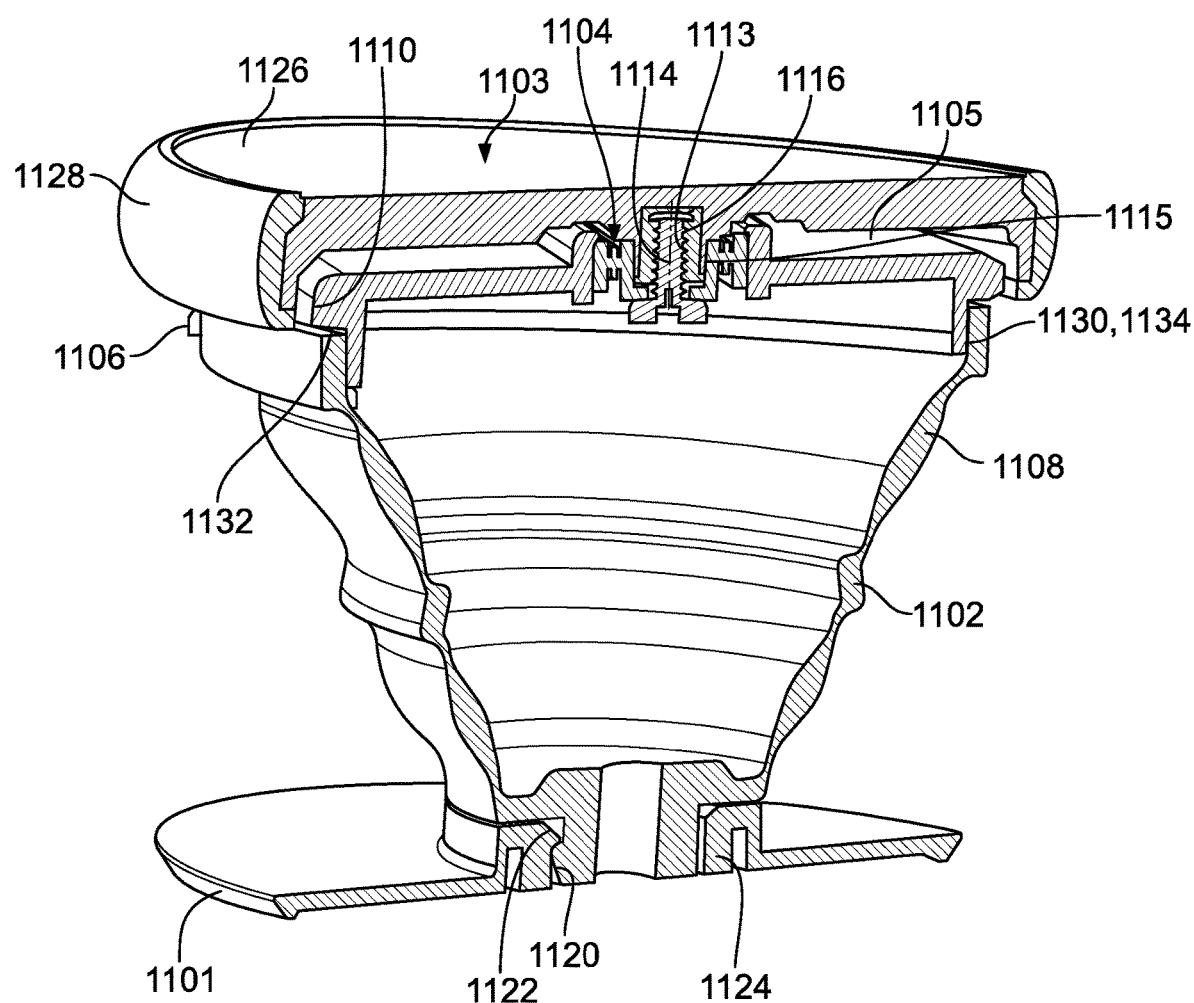
FIG. 12 is a cross-sectional view of the spinning expanding accessory of FIG. 11.

FIGS. 11 and 12 illustrate yet another example of a spinning accessory 1100. The spinning accessory 1100 is similar to the spinning accessory 400, in that it includes a platform 1101, an accordion 1102, a button 1103, a ball bearing assembly 1104 (which is identical to the ball bearing assembly 404), and a frame 1105 coupled to the accordion 1102, the button 1103, and the ball bearing assembly 1104, but is different in the manner described below.

First, while generally similar, the platform 1101 has a slightly different structure than the platform 401 and the accordion 1102 has a slightly different structure than the accordion 402. More particularly, the accordion 1102 in this example has a downwardly extending first connector 1120 (e.g., a male snap-fit portion) that is arranged to matingly engage a second connector 1122 (e.g., a female snap-fit portion) carried by an upwardly extending flange 1124 of the platform 1101 in order to couple the accordion 1102 to the platform 1101 (and vice-versa).

Second, while generally similar to the button 403, the button 1103 is different in that it is dual molded or co-molded with two different materials. In this example, the button 1103 has a base 1126 made from a plastic material and a perimeter edge 1128 made from a rubber material to facilitate gripping of the button 1103. In other examples, however, the base 1126 and/or the perimeter edge 1128 of the button 1103 can be made from one or more different materials.

Third, while the frame 1105 is similarly coupled to the accordion 1102 and similarly carries the ball bearing assembly 1104, the frame 1105 is structurally different than the frame 405. While the frame 1105 has a perimeter rim 1110 that is similar to the perimeter rim 410 of the frame 405, the frame 1105 is different in that is a solid piece (i.e., it does not include ribs) and it also includes a flange 1130 that extends downwardly from the frame 1105 proximate to the perimeter rim 1110. In this example, the flange 1130 extends downwardly from the frame 1105 at a position that is radially inward of the perimeter rim 1110. Thus, in this example, the perimeter rim 1110 is arranged to seat on a top surface 1132 of the perimeter of the accordion 1102, and the flange 1130 is arranged to engage an inner surface 1134 of the perimeter of the accordion 1102, thereby coupling the frame 1105 to the accordion 1102. In some examples, the frame 1105 can also include a plurality of tabs 1106, similar to the tabs 406, that extend outward from the perimeter rim 1110 and are disposable in slots 1107, like the slots 407, formed in and around the perimeter of the accordion 1102, in order to more securely couple the frame 1105 to the accordion 1102.

Fourth, the frame 1105 is coupled to the button 1103 in a different manner than the frame 405 is coupled to the button 403. While the frame 1105 is similarly coupled to the button 1103 by way of a securing element 1108, the securing element 1108 is different from the securing element 408. More particularly, unlike the securing element 408, the securing element 1108 has a projection 1113 that defines a threaded, outer surface. As such, unlike the frame 405, the button 1103 has a downwardly extending protrusion 1116 that defines a threaded, inner surface. Thus, the projection 1113 can be inserted into an opening 1115 of the frame 1105 that is centered about axis 1114 and arranged radially inwardly of the ball bearing assembly 1104 carried by the frame 1105, and then the projection 1113 can be inserted into the protrusion 1116 so that the outer surface of the projection 1113 threadingly engages the inner surface of the frame 1105 (and vice-versa).

Despite the aforementioned differences between the accessory 400 and the accessory 1100, the accessory 1100 operates in a substantially identical manner as the accessory 400. When the frame 1105 is coupled to the button 1103 (via the threaded engagement), the button 1103 is connected with ball bearing assembly 1104. More specifically, the projection 1116 of the button 1103 is removably disposed in the inner ring of the ball bearing assembly 1104. When the button 1103 is coupled to the inner ring of the ball bearing assembly 1104, the button 1103 can freely spin relative to the remainder of spinning accessory 1100 (e.g., the outer ring). Thus, when the spinning accessory 1100 is attached to a surface of mobile electronic device 100 (or a case for the device 100), and mobile electronic device 100 (or the case) is positioned such that button 1103 is resting on a stationary external surface, the button 1103 can remain stationary due to friction of resting on the external surface while the remaining components of spinning accessory 1100 spin easily (or relatively friction free) due to the rotation of the ball bearing assembly 1104. On the other hand, when the spinning accessory 1100 is attached to a surface of mobile electronic device 100 (or a case of the device 100), and mobile electronic device 100 (or the case) is resting on a stationary external surface, the button 1103 can spin easily (relatively friction free) while the remaining components of the spinning accessory 1100 (as well as the device 100 and/or the case) remain stationary.

While each of the depicted versions of the spinning accessory include a spinning accessory with a generally circular profile, it should be appreciated that the spinning accessory can take other shapes. For example, with respect to the embodiment of FIG. 10, while it may be critical for the inner surface of the outer ring to be circular in order to accommodate the ball bearings and facilitate smooth spinning relative to the inner ring, the outer surface can take any shape. In some embodiments, the outer surface of the outer ring can take the shape of a square, a star, a triangle, etc. These alternative shapes may facilitate gripping by a user. While alternative shapes are only mentioned expressly with respect to FIG. 10, it should be appreciated that any of the embodiments described herein could include such alternative shapes as well.

The above description and description of figures may depict exemplary configurations for an embodiment of the disclosure, which is done to aid in understanding the features and functionality that can be included in the embodiments described herein. The embodiments are not restricted to the illustrated configurations, and can be implemented using a variety of alternative configurations. Additionally, although the apparatus is described above in terms of various exemplary embodiments and implementations, it should be understood that the various features and functionality described in one or more of the individual embodiments with which they are described, but instead can be applied, alone or in some combination, to one or more of the other embodiments of the disclosure, whether or not such embodiments are described and whether or not such features are presented as being a part of a described embodiment. Thus the breadth and scope of the present disclosure, especially in claims hereafter, should not be limited by any of the above-described exemplary embodiments.

Terms and phrases used in this document, and variations thereof, unless otherwise expressly stated, should be construed as open-ended as opposed to limiting. As examples of the foregoing: the term "including" should be read to mean "including, without limitation" or the like; the term "example" is used to provide exemplary instances of the item in discussion, not an exhaustive or limiting list thereof; and adjectives such as "conventional", "traditional", "standard", "known" and terms of similar meaning should not be construed as limiting the item described to a given time period or to an item available as of a given time, but instead should be read to encompass conventional, traditional, normal, or standard technologies that may be available or known now or at any time in the future. Likewise, a group of items linked with conjunction "and" should not be read as requiring that each and every one of those items be present in the grouping, but rather should be read as "and/or" unless expressly stated otherwise. Furthermore, although item, elements, or components of the disclosure may be described or claimed in a singular, the plural is contemplated to be within the scope thereof unless limitation to the singular is explicitly stated. The presence of broadening words and phrases such as "one or more", "at least", "but not limited to" or other like phrases in some instances shall not be read to mean that the narrower case is intended or required in instances where such broadening phrases may be absent. Additionally, where a range is set forth, the upper and lower limitations of the range are inclusive of all of the intermediary units therein.

The foregoing disclosure has been presented for purposes of illustration and description. Other modifications and variations may be possible in view of the above teachings. The embodiments described in the foregoing disclosure where chosen to explain the principles of the invention and its practical application to enable others skilled in the art to best utilize the invention. It is intended that any claims thereafter be construed to include other alternative embodiments of the invention except as limited by the prior art.

The invention claimed is:

1. An expandable spinning accessory for a portable media player, the accessory comprising:
   a platform for attaching the spinning accessory to the portable media player or a case for the portable media player;
   a skin coupled to the platform, wherein the skin is deformable between a collapsed configuration and an expanded configuration;
   a button coupled to the skin opposite the platform;
   a bearing assembly coupled to the skin and to the button, the bearing assembly configured to facilitate rotation of the button relative to the skin.

2. The expandable spinning accessory of claim 1, further comprising a frame coupled to the skin, wherein the bearing assembly is carried by the frame.

3. The expandable spinning accessory of claim 1, wherein the bearing assembly comprises:
   an inner ring defining a central opening sized to receive the button of the socket accessory;
   an outer ring surrounding the inner ring, wherein the inner ring and the outer ring are rotatable relative to one another; and
   one or more balls arranged between the inner ring and the outer ring, the one or more balls configured to facilitate rotation between the inner ring and the outer ring.

4. The expandable spinning accessory of claim 3, wherein the outer ring is fixed and the inner ring is rotatable relative to the outer ring.

5. The expandable spinning accessory of claim 3, further comprising a frame coupled to the skin, wherein the outer ring of the bearing assembly is coupled to the frame.

6. The expandable spinning accessory of claim 3, wherein the one or more balls comprise a plurality of balls arranged circumferentially around the inner ring.

7. The expandable spinning accessory of claim 1, wherein the bearing assembly comprises one or more balls configured to facilitate rotation of the button relative to the skin.

8. The expandable spinning accessory of claim 7, wherein the one or more balls comprise a plurality of balls.

9. The expandable spinning accessory of claim 1, wherein the skin is deformable along an axis, and wherein the button is rotatable relative to the skin about the axis.

* * * * *